United States Patent
Huang et al.

(10) Patent No.: US 9,322,983 B2
(45) Date of Patent: Apr. 26, 2016

(54) BACKLIGHT FRAME AND BACKLIGHT MODULE

(71) Applicant: SHENZHEN CHINA STAR OPTOELECTRONICS TECHNOLOGY CO., LTD., Shenzhen, Guangdong (CN)

(72) Inventors: Bingcheng Huang, Shenzhen (CN); Xiaoyu Huang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/240,346

(22) PCT Filed: Jan. 17, 2014

(86) PCT No.: PCT/CN2014/070848
§ 371 (c)(1),
(2) Date: Feb. 21, 2014

(87) PCT Pub. No.: WO2015/032177
PCT Pub. Date: Mar. 12, 2015

(65) Prior Publication Data
US 2015/0131322 A1 May 14, 2015

(30) Foreign Application Priority Data
Sep. 9, 2013 (CN) .......................... 2013 1 0409980

(51) Int. Cl.
*F21V 8/00* (2006.01)
*G02F 1/1335* (2006.01)
*G02F 1/1333* (2006.01)

(52) U.S. Cl.
CPC ............ *G02B 6/0088* (2013.01); *G02B 6/0073* (2013.01); *G02B 6/0093* (2013.01); *G02F 1/133608* (2013.01); *G02F 1/133615* (2013.01); *G02F 2001/133314* (2013.01)

(58) Field of Classification Search
CPC .. G02B 6/0088; G02B 6/0073; G02B 6/0093; G02B 6/0086; G02B 6/0081; G02F 1/133608; G02F 1/133615; G02F 2001/133314
See application file for complete search history.

(56) References Cited

U.S. PATENT DOCUMENTS 8,439,552 B2 * 5/2013 Jeong et al. .................... 362/634
2007/0115401 A1 5/2007 Tsubokura et al. ............. 349/58
(Continued)

FOREIGN PATENT DOCUMENTS

CN 1466002 A 1/2004
(Continued)

OTHER PUBLICATIONS

International Search Report dated Jun. 18, 2014, issued to International Application No. PCT/CN2014/070848.

*Primary Examiner* — Bao Q Truong
(74) *Attorney, Agent, or Firm* — Stein IP, LLC (57) ABSTRACT

The present disclosure relates to a backlight frame including a frame body, which has a first and a second side wall opposite to each other, and a third and a fourth side wall opposite to each other, wherein at least one first protrusion is arranged in the frame body close to the first side wall, at least one second protrusion is arranged wall in the frame body close to the second side, at least one third protrusion is arranged in the frame body close to the third side wall, and at least one fourth protrusion is arranged in the frame body close to the fourth side wall. The first, second, third and fourth protrusions together define a placement area for disposing a light guide plate. Through a placement area with a regular shape for disposing the light guide plate cut in a regular manner therein, the utilization of raw material for the light guide plate to be cut can be effectively improved, and the production cost of the light guide plate can be finally reduced. In the meantime, the safety of the light guide plate can be increased. The present disclosure further relates to a backlight module, which can effectively reduce the production cost and at the same time increase the safety of the light guide plate.

16 Claims, 4 Drawing Sheets

(56) References Cited

U.S. PATENT DOCUMENTS

| | | | |
|---|---|---|---|
| 2010/0296310 A1* | 11/2010 | Jeong et al. | 362/606 |
| 2011/0128756 A1* | 6/2011 | Cho et al. | 362/606 |
| 2012/0307523 A1* | 12/2012 | Oya | 362/612 |
| 2013/0250608 A1* | 9/2013 | Chen et al. | 362/606 |

FOREIGN PATENT DOCUMENTS

| | | |
|---|---|---|
| CN | 101887890 A | 11/2010 |
| CN | 102472453 A | 5/2012 |
| CN | 103454801 A | 12/2013 |
| JP | 2008-27736 A | 2/2008 |

\* cited by examiner

BACKLIGHT FRAME AND BACKLIGHT MODULE

FIELD OF THE INVENTION

The present disclosure relates to the technical field of liquid crystal displays, and particularly relates to a backlight frame and a backlight module.

BACKGROUND OF THE INVENTION

As is well known, a thin film transistor-liquid crystal display (TFT-LCD) is one of the current main flat panel display products, and has become an important display platform in modern information technology and video products. As a liquid crystal itself does not emit light, a backlight module is required to realize the display function of the liquid crystal.

At present, the relatively mainstream backlight module adopts a side type backlight. In this type of backlight, light bars (LB) consisting of light-emitting diodes (LEDs) and an aluminium extruded section are arranged on the lateral surfaces of a backlight frame. Then, light is transmitted to a display area through a light guide plate (LGP) mounted on the backlight frame. Afterwards, the light passes through an optical diaphragm, such as a prism or a diffuser, and finally forms a uniform light source.

Figure 1:
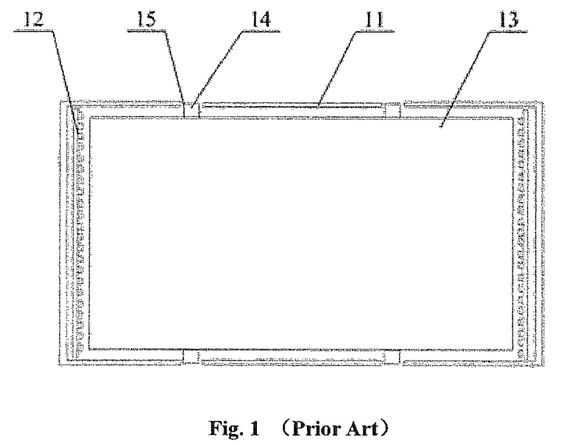
FIG. 1 is a schematic diagram of an assembly structure of a light guide plate on a backlight frame in the prior art.
Figure 2:
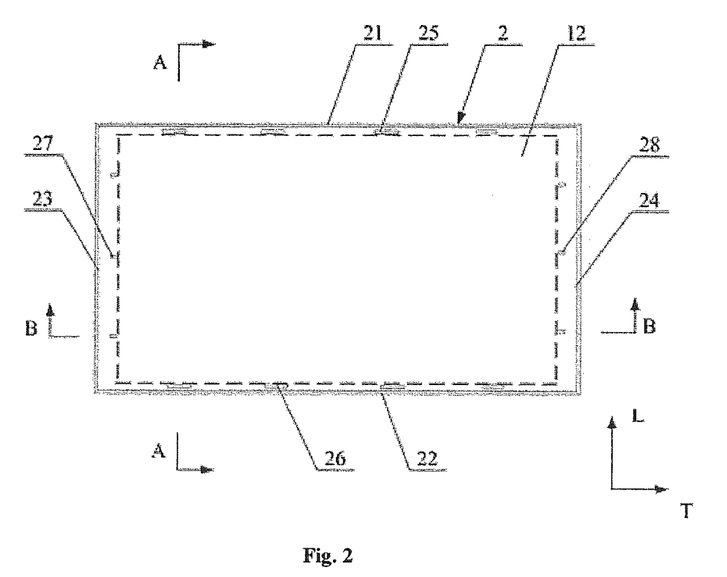
FIG. 2 is a top view of a backlight frame provided in example I of the present disclosure.

As shown in FIG. 1, a commonly-used light guide plate at present is mounted on the backlight frame in such a manner that when the light guide plate 13 is cut, protrusions 14 or grooves (only protrusions 14 shown in the figure) are formed on the top and bottom sides (namely two sides along the transverse direction indicated by the direction T in FIG. 2) of the light guide plate 13 respectively. Then, corresponding grooves 15 or corresponding protrusions (only grooves 15 shown in the figure) are formed on two sides of the backlight frame 11 along the transverse direction respectively, and form a shape-complementary fit with the protrusions 14 or grooves on the light guide plate 13 respectively. Therefore, the light guide plate 13 can be secured in the backlight frame 11. Meanwhile, light bars 12 are arranged on two sides of the backlight frame 11 along the longitudinal direction (i.e., the direction L shown in FIG. 2), respectively.

However, with such a mounting manner, the protrusions or the grooves need to be directly formed when the light guide plate is cut, so that the light guide plate has to be cut in an irregular way. Therefore, the utilization of raw material for the light guide plate to be cut will be reduced, and the production cost will be raised at last.

SUMMARY OF THE INVENTION

Aiming at the above-mentioned defects in the prior art, the objective of the present disclosure is to provide a backlight frame, in which a regularly cut light guide plate can be mounted, so as to effectively improve the utilization of a raw material for the light guide plate to be cut.

The objective of the present disclosure is to provide a backlight module, in which a regularly cut light guide plate can be mounted, so as to effectively improve the utilization of a raw material for the light guide plate to be cut.

1) A backlight frame provided in the present disclosure includes a frame body, having a first side wall and a second side wall opposite to each other and a third side wall and a fourth side wall opposite to each other, wherein at least one first protrusion is arranged in the frame body close to the first side wall, at least one second protrusion is arranged wall in the frame body close to the second side, at least one third protrusion is arranged in the frame body close to the third side wall, and at least one fourth protrusion is arranged in the frame body close to the fourth side wall, and wherein the first protrusion, the second protrusion, the third protrusion and the fourth protrusion together define a placement area for disposing a light guide plate.

2) In a preferred embodiment of item 1) of the present disclosure, a plurality of first protrusions is arranged at intervals along a transverse direction, a plurality of second protrusions is arranged at intervals along the transverse direction, a plurality of third protrusions is arranged at intervals along a longitudinal direction, and a plurality of fourth protrusions is arranged at intervals along the longitudinal direction.

3) In a preferred embodiment of item 2) of the present disclosure, the plurality of first protrusions is arranged at equal intervals along the transverse direction, the plurality of second protrusions is arranged at equal intervals along the transverse direction, the plurality of third protrusions is arranged at equal intervals along the longitudinal direction, and the plurality of fourth protrusions is arranged at equal intervals along the longitudinal direction.

4) In a preferred embodiment of any one of items 1) to 3) of the present disclosure, the quantity of the first protrusions is the same as that of the second protrusions, and the first protrusions and the second protrusions are arranged symmetrically along the transverse direction; the quantity of the third protrusions is the same as that of the fourth protrusions, and the third protrusions and the fourth protrusions are arranged symmetrically along the longitudinal direction.

5) In a preferred embodiment of any one of items 1) to 4) of the present disclosure, the vertical height of each first protrusion is greater than or equal to one half of the thickness of the light guide plate and smaller than or equal to the thickness of the light guide plate; the vertical height of each second protrusion is greater than or equal to one half of the thickness of the light guide plate and smaller than or equal to the thickness of the light guide plate; the vertical height of each third protrusion is greater than or equal to one half of the thickness of the light guide plate and smaller than or equal to the thickness of the light guide plate; and the vertical height of each fourth protrusion is greater than or equal to one half of the thickness of the light guide plate and smaller than or equal to the thickness of the light guide plate.

6) In a preferred embodiment of any one of items 1) to 5) of the present disclosure, the longitudinal width of each first protrusion is one third of self vertical height; the longitudinal width of each second protrusion is one third of self vertical height; the transverse width of each third protrusion is one third of self vertical height; and the transverse width of each fourth protrusion is one third of self vertical height.

7) In a preferred embodiment of any one of items 1) to 6) of the present disclosure, the cross sectional shape of the top of each first protrusion along the longitudinal direction is configured as a semicircle; the cross sectional shape of the top of each second protrusion along the longitudinal direction is configured as a semicircle; the cross sectional shape of the top of each third protrusion along the transverse direction is configured as a semicircle; and the cross sectional shape of the top of each fourth protrusion along the transverse direction is configured as a semicircle.

8) In a preferred embodiment of any one of items 1) to 7) of the present disclosure, at least one first elastic member is arranged on the third side wall, and at least one second elastic member is arranged on the fourth side wall, wherein one end of the first elastic member is fixedly connected with the third side wall, and the other end of the first elastic member transversely extends to the interior of the frame, and wherein one end of the second elastic member is fixedly connected with the fourth side wall, and the other end of the second elastic member transversely extends to the interior of the frame.

9) In a preferred embodiment of item 8) of the present disclosure, two first elastic members are arranged at two longitudinal ends of the third side wall respectively, and two second elastic members are arranged at two longitudinal ends of the fourth side wall respectively.

A backlight module provided in the present disclosure includes a backlight frame of any one of items 1) to 9), and a light guide plate disposed in a placement area, wherein a first light bar is arranged in a frame body close to a third side wall and located between the third side wall and the third protrusions, and a second light bar is arranged in the frame body close to a fourth side wall and located between the fourth side wall and the fourth protrusions, and wherein a reflecting diaphragm is arranged between the light guide plate and the frame body.

Compared with the prior art, the backlight frame provided in the present disclosure has the advantage in that the first protrusions, the second protrusions, the third protrusions and the fourth protrusions together define a relatively regular placement area (for example, a rectangular placement area) for disposing the light guide plate, so that the light guide plate out in a regular manner may be placed in the frame body. In this way, the utilization of raw material for the light guide plate to be cut can be effectively improved, and the production cost of the light guide plate can be finally reduced.

Meanwhile, when the light guide plate is disposed in the backlight frame, the stress exerting to the light guide plate can be dispersed through the first protrusions, the second protrusions, the third protrusions and the fourth protrusions on four sides thereof. Therefore, the vibrating impact of the light guide plate can be released through a plurality of stress points. In this way, the problem that the light guide plate is easy to break due to concentrated stress of the light guide plate at protrusions or grooves during traditional assembly operation can be effectively avoided, and then the safety of the light guide plate can be effectively improved.

In a further technical solution, a plurality of first protrusions, a plurality of second protrusions, a plurality of third protrusions and a plurality of fourth protrusions are provided. These protrusions can release the stress generated by the vibrating impact of the light guide plate, so that the safety of the light guide plate can be further improved.

In a further technical solution, a plurality of first protrusions, second protrusions, third protrusions and fourth protrusions are arranged at equal intervals to ensure the stress being uniform. Therefore, the safety of the light guide plate can be further improved.

In a further technical solution, the first protrusions and the second protrusions have the same quantity and are arranged symmetrically, and the third protrusions and the fourth protrusions have the same quantity and are arranged symmetrically. Therefore, the stress of the light guide plate in the longitudinal direction and that in the horizontal direction are distributed in a uniform manner. Therefore, the safety of the light guide plate can be further improved.

In a further technical solution, the heights of the first protrusions, the second protrusions, the third protrusions and the fourth protrusions are greater than or equal to one half of the height of the light guide plate but smaller or equal to the height of the light guide plate, so that the assembly stability of the light guide plate can be ensured to a maximum extent, without affecting subsequent assembly operations of the backlight module.

In a further technical solution, the widths of the first protrusions, the second protrusions, the third protrusions and the fourth protrusions are one third of the heights thereof, so that the assembly stability of the light guide plate can be ensured, and at the same time the widths of the first protrusions, the second protrusions, the third protrusions and the fourth protrusions can be reduced as much as possible. Consequently, the placement area in the frame body can be enlarged as much as possible.

In a further technical solution, through forming the cross sectional shapes of the tops of the first protrusions, the second protrusions, the third protrusions and the fourth protrusions as a semicircle, the impact of the tops of the first protrusions, the second protrusions, the third protrusions and the fourth protrusions to the light guide plate when the light guide plate is assembled may be effectively avoided. Therefore, the damages to the light guide plate can be reduced, and the safety of the light guide plate can be further improved.

In a further technical solution, first elastic members and second elastic members are arranged in the frame body. They can provide buffer function to the light guide plate when the backlight module falls, so as to further improve the safety of the light guide plate.

In a further technical solution, two first elastic members and two second electric members are provided, so that at four corners of the light guide plate there is an elastic member. In this way, the safety of the light guide plate can be further improved.

Compared with the prior art, the first protrusions, the second protrusions, the third protrusions and the fourth protrusions in the backlight frame according to the present disclosure together define a relatively regular placement area (for example, a rectangular placement area) for disposing the light guide plate therein, so that the light guide plate cut in a regular manner may be placed in the frame body. In this way, the utilization of raw material for the light guide plate to be cut can be effectively improved, and the production cost of the light guide plate can be finally reduced.

Meanwhile, when the light guide plate is disposed in the backlight frame, the stress exerting to the light guide plate can be dispersed through the first protrusions, the second protrusions, the third protrusions and the fourth protrusions on four sides thereof. Therefore, the vibrating impact of the light guide plate can be released through a plurality of stress points. In this way, the problem that the light guide plate is easy to break due to concentrated stress of the light guide plate at protrusions or grooves during traditional assembly operation can be effectively avoided, and then the safety of the light guide plate and the backlight module can be effectively improved.

The above-mentioned technical features may be combined in various appropriate forms or substituted by equivalent technical features, as long as the objectives of the present disclosure can be fulfilled.

BRIEF DESCRIPTION OF THE DRAWINGS

The present disclosure will be described in more detail below based on non-limiting examples with reference to the accompanying drawings, in which.

LIST OF REFERENCE SIGNS

11—backlight frame, 12—light bar, 13—light guide plate, 14—protrusion, 15—groove;

2—frame body, 21—first side wall, 22—second side wall, 23—third side wall, 24—fourth side wall, 25—first protrusion, 26—second protrusion, 27—third protrusion, 28—fourth protrusion, 29—placement area; and 3—first elastic member, 4—second elastic member, 5—light guide plate, 6—first light bar, 7—second light bar, 8—reflecting diaphragm.

DETAILED DESCRIPTION OF THE EMBODIMENTS

In order to enable the objects, technical solutions and advantages of the present disclosure more clearly, the technical solutions of the present disclosure will be described in a clear and complete manner hereinafter. All other embodiments obtained by one skilled in the art based on the embodiments as disclosed in the present disclosure without involvement of any creative work are deemed as falling within the protection scope of the present disclosure.

Figure 3:
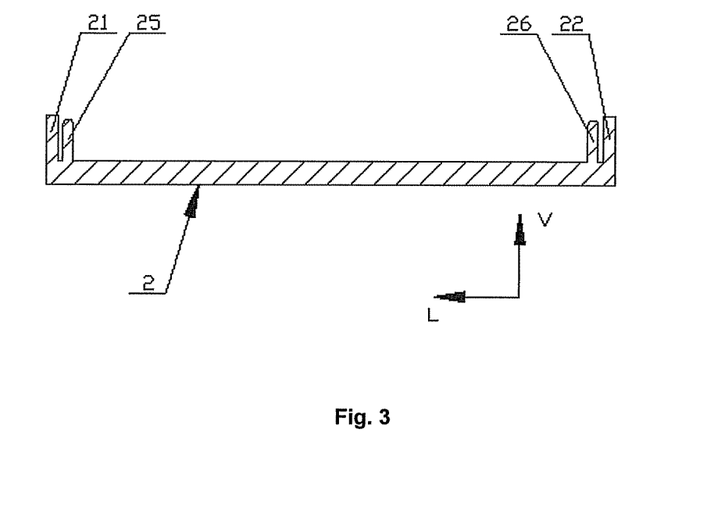
FIG. 3 is a section view along line A-A in FIG. 2.

Before the specific embodiments are described, directional terms mentioned in the present disclosure are defined as follows. As shown in FIG. 2, in a frame body 2, the direction along the line perpendicular to a first side wall 21 and a second side wall 22 is defined as the longitudinal direction L; the direction along the line perpendicular to a third side wall 23 and a fourth side wall 24 is defined as the transverse direction T; and as shown in FIG. 3, the direction along the line perpendicular to the bottom and the top of the frame body 2 is defined as the vertical direction V.

EXAMPLE I

As shown in FIG. 2, a backlight frame provided in this example includes a frame body 2, which has a first side wall 21 and a second side wall 22 opposite to each other, and a third side wall 23 and a fourth side wall 24 opposite to each other. At least one first protrusion 25 is arranged in the frame body 2 close to the first side wall 21, at least one second protrusion 26 is arranged in the frame body 2 close to the second side wall 22, at least one third protrusion 27 is arranged in the frame body 2 close to the third side wall 23, and at least one fourth protrusion 28 is arranged in the frame body 2 close to the fourth side wall 24. The first protrusion 25, the second protrusion 26, the third protrusion 27 and the fourth protrusion 28 together define a placement area 29 for a light guide plate.

In use, the first protrusion 25, the second protrusion 26, the third protrusion 27 and the fourth protrusion 28 together define a generally regular placement area 29, such as a rectangular one as shown by dotted lines in FIG. 2, in which the light guide plate can be disposed. Therefore, the light guide plate cut in a regular manner may be placed in the frame body 2, so that the utilization of raw material for the light guide plate to be cut can be effectively improved, and the production cost of the light guide plate can be finally reduced.

Meanwhile, since the light guide plate is placed in the frame body 2, the stress generated when the light guide plate is subjected to vibrating impact can be dispersed through the first protrusion 25, the second protrusion 26, the third protrusion 27 and the fourth protrusion 28 arranged on four sides of the light guide plate respectively. Therefore, the vibrating impact of the light guide plate can be released through a plurality of stress points. In this way, the problem that the light guide plate is easy to break due to concentrated stress of the light guide plate at protrusions or grooves during traditional assembly operation can be effectively avoided, and then the safety of the light guide plate can be effectively improved.

In this example, as the first protrusion 25, the second protrusion 26, the third protrusion 27 and the fourth protrusion 28 can realize a multi-point dispersion for stress generated when the light guide plate is subjected to vibrating impact, the problem that the light guide plate is easy to break due to concentrated stress of the light guide plate at protrusions or grooves during traditional assembly operation can be effectively avoided. To this end, a plurality of first protrusions 25 can be arranged at intervals along the transverse direction, a plurality of second protrusions 26 can be arranged at intervals along the transverse direction, a plurality of third protrusions 27 can be arranged at intervals along the longitudinal direction, and a plurality of fourth protrusions 28 can be arranged at intervals along the longitudinal direction. In this example, four first protrusions 25, four second protrusions 26, three third protrusions 27 and three fourth protrusions 28 are provided. In this case, when the light guide plate is subjected to vibrating impact in any direction, the impact stress of the light guide plate in this direction can be uniformly dispersed through a plurality of stress points. Therefore, the safety of the light guide plate can be further improved.

Further, in this example, a plurality of first protrusions 25 can be arranged at equal intervals along the transverse direction, a plurality of second protrusions 26 can be arranged at equal intervals along the transverse direction, a plurality of third protrusions 27 can be arranged at equal intervals along the longitudinal direction, and a plurality of fourth protrusions 28 can be arranged at equal intervals along the longitudinal direction. With such a configuration, when the light guide plate is subjected to vibrating impact in any direction, the stress of the light guide plate in this direction can be uniformly dispersed through the plurality of protrusions arranged at equal intervals. Therefore, the damage to the light guide plate caused by uneven stresses among the plurality of protrusions can be effectively avoided, so that the safety of the light guide plate can be further improved.

Further, in this example, the quantity of the first protrusions 25 may be the same as that of the second protrusions 26, and the first protrusions 25 and the second protrusions 26 are arranged symmetrically along the transverse direction. Also, the quantity of the third protrusions 27 may be the same as that of the fourth protrusions 28, and the third protrusions 27 and the fourth protrusions 28 are arranged symmetrically along the longitudinal direction. With such a configuration, when the light guide plate is subjected to longitudinal vibrating impact, the stress positions of the light guide plate at both longitudinal ends are symmetrical to each other; and when the light guide plate is subjected to transverse vibrating impact, the stress positions of the light guide plate at both transverse ends are symmetrical to each other. Therefore, the damage to the light guide plate caused by uneven stresses at both ends of the light guide plate can be effectively avoided, so that the safety of the light guide plate can be further improved.

In this example, since the light guide plate is disposed and held in the placement area 29 through the first protrusions 25, the second protrusions 26, the third protrusions 27 and the fourth protrusions 28, the first protrusions 25, the second protrusions 26, the third protrusions 27 and the fourth protrusions 28 should have certain heights. However, other components have to be mounted above the light guide plate during the assembly operation of a backlight module. Therefore, the heights of the first protrusions 25, the second protrusions 26, the third protrusions 27 and the fourth protrusions 28 should be selected in a manner such that the assembly of said other components cannot be influenced. Thus, the heights of the first protrusions 25, the second protrusions 26, the third protrusions 27 and the fourth protrusions 28 need to be limited. Specifically, the vertical height of each first protrusion 25 should be greater than or equal to one half of the thickness of the light guide plate, and smaller than or equal to the thickness of the light guide plate; the vertical height of each second protrusion 26 should be greater than or equal to one half of the thickness of the light guide plate, and smaller than or equal to the thickness of the light guide plate; the vertical height of each third protrusion 27 should be greater than or equal to one half of the thickness of the light guide plate, and smaller than or equal to the thickness of the light guide plate; and the vertical height of each fourth protrusion 28 should be greater than or equal to one half of the thickness of the light guide plate, and smaller than or equal to the thickness of the light guide plate. Thus, the assembly stability of the light guide plate can be ensured to a maximum extent without affecting subsequent assembly of the backlight module.

In this example, as the light guide plate disposed in the frame body 2 forms the display area, the placement area 29 should be configured as large as possible. However, the first protrusions 25 are arranged close to the first side wall 21, the second protrusions 26 are arranged close to the second side wall 22, the third protrusions 27 are arranged close to the third side wall 23, and the fourth protrusions 28 are arranged close to the fourth side wall 24. Meanwhile, light bars should be arranged between the third protrusions 27 and the third side wall 23, and also between the fourth protrusions 28 and the fourth side wall 24. Therefore, the widths of the first protrusions 25, the second protrusions 26, the third protrusions 27 and the fourth protrusions 28 need to be limited, in order to maximize the placement area 29 as much as possible. Specifically, the longitudinal width of each first protrusion 25 is one third of its own vertical height; the longitudinal width of each second protrusion 26 is one third of its own vertical height; the transverse width of each third protrusion 27 is one third of its own vertical height; and the transverse width of each fourth protrusion 28 is one third of its own vertical height. Therefore, when the assembly stability of the light guide plate is ensured, the widths of the first protrusions 25, the second protrusions 26, the third protrusions 27 and the fourth protrusions 28 are reduced as much as possible. Consequently, the placement area 29 in the frame body 2 can be enlarged as much as possible.

Figure 4:
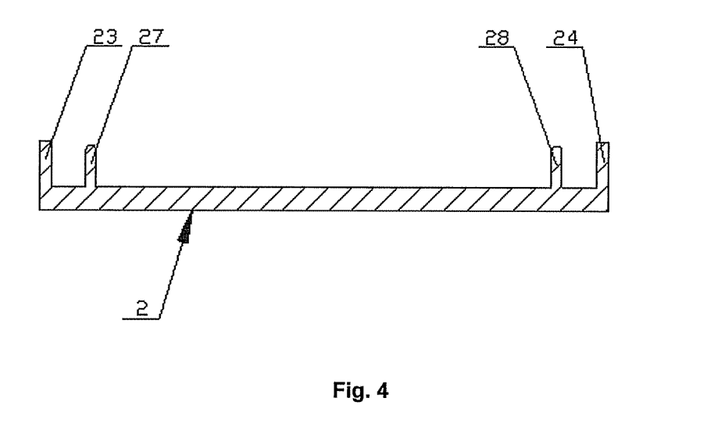
FIG. 4 is a section view along line B-B in FIG. 2.

In this example, when the light guide plate is disposed in the placement area 29, the light guide plate may be in contact with the tops of the first protrusions 25, the second protrusions 26, the third protrusions 27 and the fourth protrusions 28. If sharp protrusions are formed on the tops of the first protrusions 25, the second protrusions 26, the third protrusions 27 and the fourth protrusions 28, the light guide plate may be damaged when the sharp protrusions are in contact with the light guide plate, thus deteriorating the performance of the light guide plate. To this end, as shown in FIG. 3 and FIG. 4, the cross sectional shape of the top of each first protrusion 25 along the longitudinal direction is configured as a semicircle, and the cross sectional shape of the top of each first protrusion 26 along the longitudinal direction is configured as a semicircle, while the cross sectional shape of the top of each third protrusion 27 along the transverse direction is configured as a semicircle, and the cross sectional shape of the top of each fourth protrusion 28 along the transverse direction is configured as a semicircle. Through providing a semicircular cross sectional shape for each top of the first protrusions 25, the second protrusions 26, the third protrusions 27 and the fourth protrusions 28, the impact of the tops of the first protrusions 25, the second protrusions 26, the third protrusions 27 and the fourth protrusions 28 to the light guide plate when the light guide plate is mounted may be effectively avoided, so that the risk of damaging the light guide plate can be reduced, and then the safety of the light guide plate can be improved.

Figure 5:
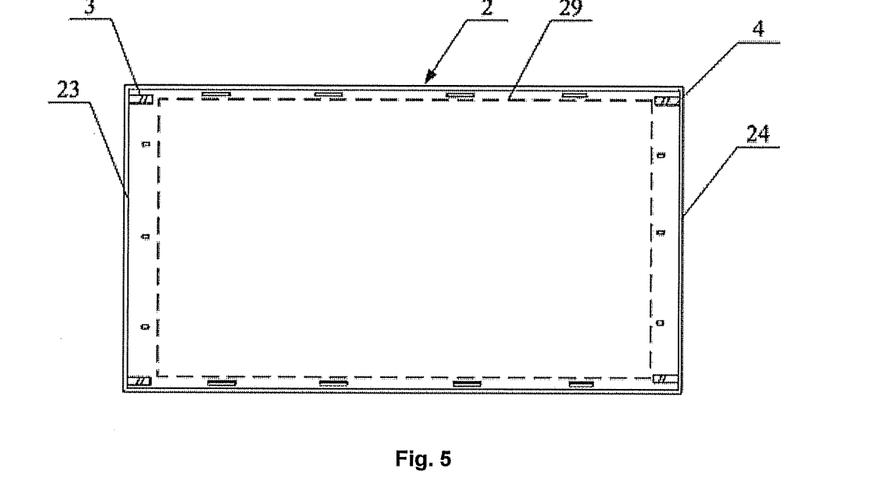
FIG. 5 is a top view of another backlight frame provided in example I of the present disclosure.

In this example, when the light guide plate is subjected to vibrating impact, the impact will be dispersedly released through a plurality of protrusions. However, when the vibrating impact is excessive (such as when the vibrating impact is resulted from falling), the impact after dispersed by each protrusion may still be relatively large, and the light guide plate may still be damaged and even broken. In this case, the safety of the light guide plate will be affected. To this end, as shown in FIG. 5, at least one first elastic member 3 is arranged on the third side wall 23, and at least one second elastic member 4 is arranged on the fourth side wall 24. One end of the first elastic member 3 is fixedly connected with the third side wall 23, and the other end of the first elastic member 3 transversely extends to the interior of the frame. Similarly, one end of the second elastic member 4 is fixedly connected with the fourth side wall 24, and the other end of the second elastic member 4 transversely extends to the interior of the frame.

In use, after the light guide plate is disposed in the placement area 29, the first elastic member 3 will be abutted against and connected with the side wall of the light guide plate. At the same time, the second elastic member 4 will be abutted against and be connected with an opposite side wall of the light guide plate. The first elastic member 3 and the second elastic member 4 may provide a buffering function for the light guide plate when the backlight module falls, so as to further improve the safety of the light guide plate.

In a further preferred example, two first elastic members 3 are arranged at both longitudinal ends of the third side wall 23, and two second elastic members 4 are arranged at both longitudinal ends of the fourth side wall 24. Thus, an elastic member is arranged at each of four corners of the light guide plate, and the safety of the light guide plate can be further improved.

In an example, the first elastic member 3 and the second elastic member 4 are preferably ring springs. The ring springs can provide buffer functions for the light guide plate in the transverse direction through inherent elasticity, and also in the longitudinal direction through inherent bending strength.

EXAMPLE II

Figure 6:
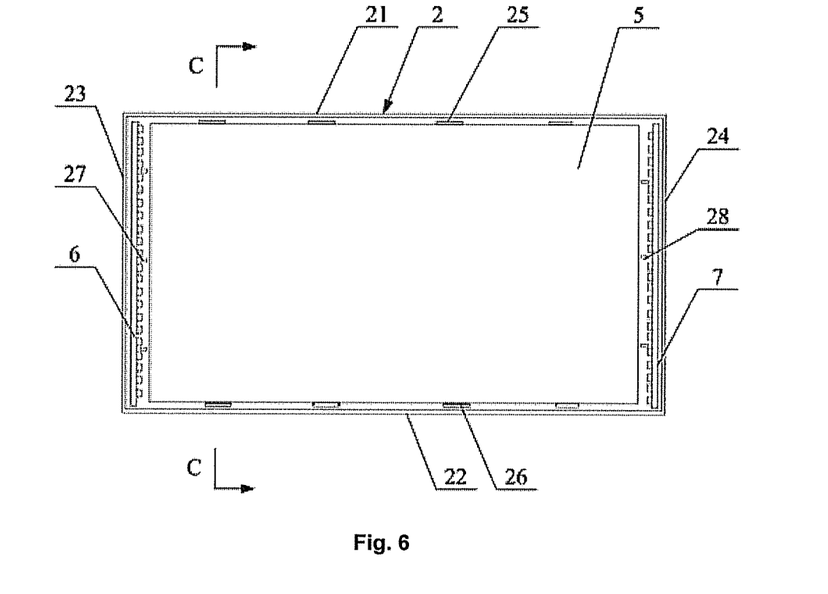
FIG. 6 is a schematic diagram of an inner structure of a backlight module provided in example II of the present disclosure.
Figure 7:
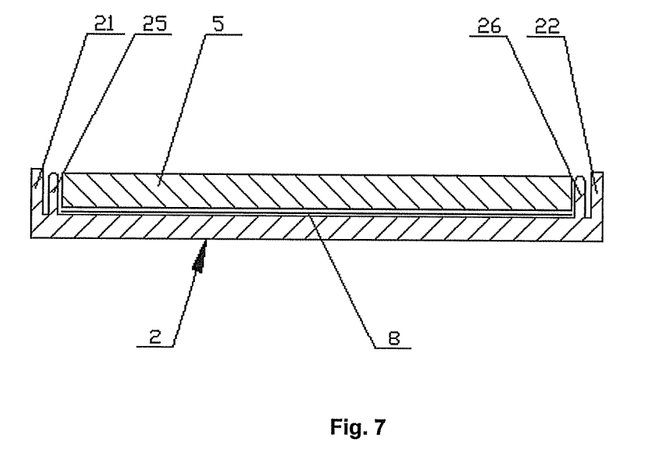
FIG. 7 is a section view along line C-C in FIG. 3.

As shown in FIG. 6 and FIG. 7, a backlight module is provided in this example and includes the backlight frame according to example I, and a light guide plate 5 disposed in the placement area 29. A first light bar 6 is arranged in a frame body 2 close to a third side wall 23, and disposed between the third side wall 23 and the third protrusions 27. At the same time, a second light bar 7 is arranged in the frame body 2 close to a fourth side wall 24, and disposed between the fourth side wall 24 and the fourth protrusions 28. A reflecting diaphragm 8 is further arranged between the light guide plate 5 and the frame body 2.

In use, the first protrusion 25, the second protrusion 26, the third protrusion 27 and the fourth protrusion 28 together define a generally regular placement area 29, in which the light guide plate can be disposed. For example, the placement area 29 can be a rectangular one, as shown by dotted lines in FIG. 2. Therefore, the light guide plate cut in a regular manner may be placed in the frame body 2, so that the utilization of raw material for the light guide plate to be cut can be effectively improved, and the production cost of the light guide plate can be finally reduced.

Meanwhile, since the light guide plate 5 is placed in the frame body 2, the stress generated when the light guide plate 5 is subjected to vibrating impact can be dispersed through the first protrusion 25, the second protrusion 26, the third protrusion 27 and the fourth protrusion 28 arranged on four sides of the light guide plate 5 respectively. Therefore, the vibrating impact of the light guide plate 5 can be released through a plurality of stress points. In this way, the problem that the light guide plate 5 is easy to break due to concentrated stress of the light guide plate 5 at protrusions or grooves during traditional assembly operation can be effectively avoided, and then the safety of the light guide plate 5 can be effectively improved.

Finally, it should be noted that the preceding embodiments and examples are merely used for illustrating the technical solutions of the present disclosure, rather than limiting the present disclosure; though the present disclosure is illustrated in detail with reference to the preceding embodiments and examples, it should be understood by those of ordinary skill in the art that modifications may still be made to the technical solutions recorded in the preceding embodiments or examples, or equivalent alterations may be made to a part of technical features thereof; and these modifications or alterations do not make the nature of corresponding technical solutions depart from the spirit and scope of the technical solutions of the embodiments or examples of the present disclosure.

The invention claimed is:

1. A backlight frame including a frame body, which has a first side wall and a second side wall opposite to each other, and a third side wall and a fourth side wall opposite to each other,
   wherein at least one first protrusion is arranged in the frame body close to the first side wall, at least one second protrusion is arranged in the frame body close to the second side wall, at least one third protrusion is arranged in the frame body close to the third side wall, and at least one fourth protrusion is arranged in the frame body close to the fourth side wall,
   wherein the first protrusion, the second protrusion, the third protrusion and the fourth protrusion together define a placement area for disposing a light guide plate, and
   the first protrusion, the second protrusion, the third protrusion and the fourth protrusion are all integrated in the bottom of the frame body wall,
   wherein at least one first elastic member is arranged on the third side wall, and at least one second elastic member is arranged on the fourth side wall,
   wherein one end of the first elastic member is fixedly connected with the third side wall, and the other free end thereof transversely extends toward the interior of the frame,
   wherein one end of the second elastic member is fixedly connected with the fourth side wall, and the other free end thereof transversely extends toward the interior of the frame, and
   wherein the first elastic member and the second elastic member are ring springs.

2. The backlight frame according to claim 1, wherein a plurality of first protrusions is arranged at intervals along a transverse direction, a plurality of second protrusions is arranged at intervals along the transverse direction, a plurality of third protrusions is arranged at intervals along a longitudinal direction, and a plurality of fourth protrusions is arranged at intervals along the longitudinal direction.

3. The backlight frame according to claim 2, wherein the plurality of first protrusions is arranged at equal intervals along the transverse direction, the plurality of second protrusions is arranged at equal intervals along the transverse direction, the plurality of third protrusions is arranged at equal intervals along the longitudinal direction, and the plurality of fourth protrusions is arranged at equal intervals along the longitudinal direction.

4. The backlight frame according to claim 1, wherein the quantity of the first protrusions is the same as that of the second protrusions, and the first protrusions and the second protrusions are arranged symmetrically along the transverse direction; and
   wherein the quantity of the third protrusions is the same as that of the fourth protrusions, and the third protrusions and the fourth protrusions are arranged symmetrically along the longitudinal direction.

5. The backlight frame according to claim 1, wherein the vertical height of each of the first protrusion, the second protrusion, the third protrusion and the fourth protrusion is greater than or equal to one half of the thickness of the light guide plate but smaller than or equal to the thickness of the light guide plate.

6. The backlight frame according to claim 1, wherein the longitudinal width of each of the first protrusion and the second protrusion is one third of the vertical height thereof respectively, and the transverse width of each of the third protrusion and the fourth protrusion is one third of the vertical height thereof respectively.

7. The backlight frame according to claim 1, wherein the cross sectional shape of the top of each of the first protrusion and the second protrusion along the longitudinal direction is configured as a semicircle, and the cross sectional shape of the top of each of the third protrusion and the fourth protrusion along the transverse direction is configured as a semicircle.

8. The backlight frame according to claim 1, wherein two first elastic members are arranged at two longitudinal ends of the third side wall respectively, and two second elastic members are arranged at two longitudinal ends of the fourth side wall respectively.

9. A backlight module including a backlight frame and a light guide plate,
   the backlight frame comprising a frame body, which has a first side wall and a second side wall opposite to each other, and a third side wall and a fourth side wall opposite to each other, wherein at least one first protrusion is arranged in the frame body close to the first side wall, at least one second protrusion is arranged in the frame body close to the second side wall, at least one third protrusion is arranged in the frame body close to the third side wall, and at least one fourth protrusion is arranged in the frame body close to the fourth side wall,
   wherein the first protrusion, the second protrusion, the third protrusion and the fourth protrusion together define a placement area in which said light guide plate is disposed, and the first protrusion, the second protrusion, the third protrusion and the fourth protrusion are all integrated in the bottom of the frame body wall; wherein at least one first elastic member is arranged on the third side wall, and at least one second elastic member is arranged on the fourth side wall, wherein one end of the first elastic member is fixedly connected with the third side wall, and the other free end thereof transversely extends toward the interior of the frame, wherein one end of the second elastic member is fixedly connected with the fourth side wall, and the other free end thereof transversely extends toward the interior of the frame, and wherein the first elastic member and the second elastic member are ring springs, a first light bar is arranged in the frame body close to the third side wall and located between the third side wall and the third protrusions, and a second light bar is arranged in the frame body close to the fourth side wall and located between the fourth side wall and the fourth protrusions; and a reflecting diaphragm is arranged between the light guide plate and the frame body.

10. The backlight module according to claim 9, wherein a plurality of first protrusions is arranged at intervals along a transverse direction, a plurality of second protrusions is arranged at intervals along the transverse direction, a plurality of third protrusions is arranged at intervals along a longitudinal direction, and a plurality of fourth protrusions is arranged at intervals along the longitudinal direction.

11. The backlight module according to claim 10, wherein the plurality of first protrusions is arranged at equal intervals along the transverse direction, the plurality of second protrusions is arranged at equal intervals along the transverse direction, the plurality of third protrusions is arranged at equal intervals along the longitudinal direction, and the plurality of fourth protrusions is arranged at equal intervals along the longitudinal direction.

12. The backlight module according to claim 9, wherein the quantity of the first protrusions is the same as that of the second protrusions, and the first protrusions and the second protrusions are arranged symmetrically along the transverse direction; and wherein the quantity of the third protrusions is the same as that of the fourth protrusions, and the third protrusions and the fourth protrusions are arranged symmetrically along the longitudinal direction.

13. The backlight module according to claim 9, wherein the vertical height of each of the first protrusion, the second protrusion, the third protrusion and the fourth protrusion is greater than or equal to one half of the thickness of the light guide plate but smaller than or equal to the thickness of the light guide plate.

14. The backlight module according to claim 9, wherein the longitudinal width of each of the first protrusion and the second protrusion is one third of the vertical height thereof respectively, and the transverse width of each of the third protrusion and the fourth protrusion is one third of the vertical height thereof respectively.

15. The backlight module according to claim 9, wherein the cross sectional shape of the top of each of the first protrusion and the second protrusion along the longitudinal direction is configured as a semicircle, and the cross sectional shape of the top of each of the third protrusion and the fourth protrusion along the transverse direction is configured as a semicircle.

16. The backlight module according to claim 9, wherein two first elastic members are arranged at two longitudinal ends of the third side wall respectively, and two second elastic members are arranged at two longitudinal ends of the fourth side wall respectively.

* * * * *